No. 767,737. PATENTED AUG. 16, 1904.
W. R. CUNNINGHAM.
MACHINE FOR MAKING HOLLOW BLOCKS.
APPLICATION FILED NOV. 30, 1903.
NO MODEL. 2 SHEETS—SHEET 1.
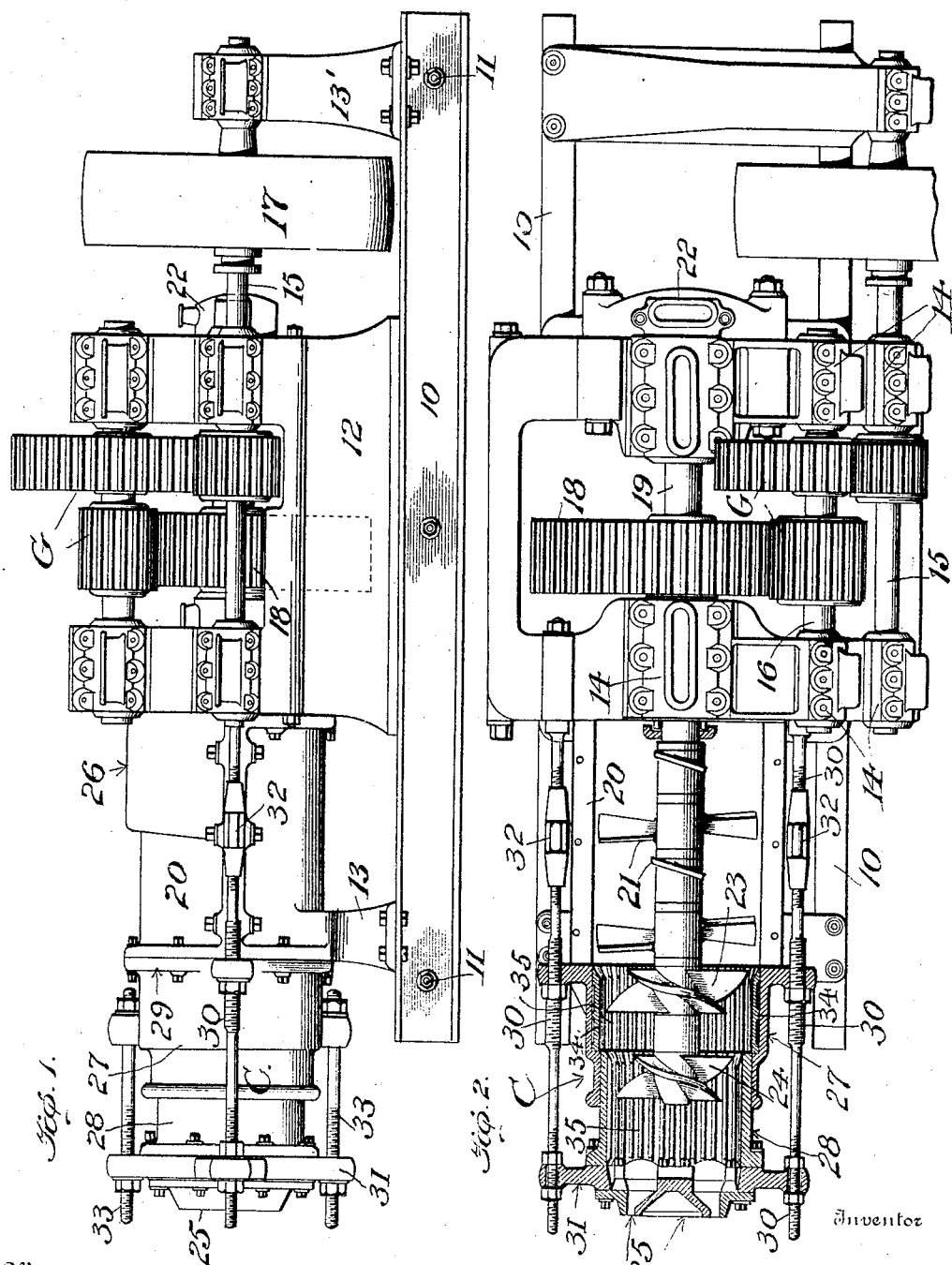

No. 767,737. PATENTED AUG. 16, 1904.
W. R. CUNNINGHAM.
MACHINE FOR MAKING HOLLOW BLOCKS.
APPLICATION FILED NOV. 30, 1903.
NO MODEL. 2 SHEETS—SHEET 2.

Witnesses
Inventor
William R. Cunningham
By T. Walter Fowler
his Attorney

No. 767,737. Patented August 16, 1904.

UNITED STATES PATENT OFFICE.

WILLIAM R. CUNNINGHAM, OF BUCYRUS, OHIO, ASSIGNOR TO THE AMERICAN CLAY WORKING MACHINERY COMPANY, OF BUCYRUS, OHIO, A CORPORATION OF OHIO.

MACHINE FOR MAKING HOLLOW BLOCKS.

SPECIFICATION forming part of Letters Patent No. 767,737, dated August 16, 1904.

Application filed November 30, 1903. Serial No. 183,271. (No model.)

*To all whom it may concern:*

Be it known that I, WILLIAM R. CUNNINGHAM, a citizen of the United States, residing at Bucyrus, in the county of Crawford and State of Ohio, have invented new and useful Improvements in Machines for Making Hollow Blocks, of which the following is a specification.

This invention relates to that class of machines which is designed to express a plastic substance, as clay, through a forming-die by means of an auger or screw, and therefore is commercially known as an "auger-machine."

The present invention has for its special object the construction of a machine of the class specified wherein the forming-die is designed for making hollow building-blocks; and said invention consists of the parts and the constructions and combinations of parts, which I will hereinafter describe and claim.

Figure 3:
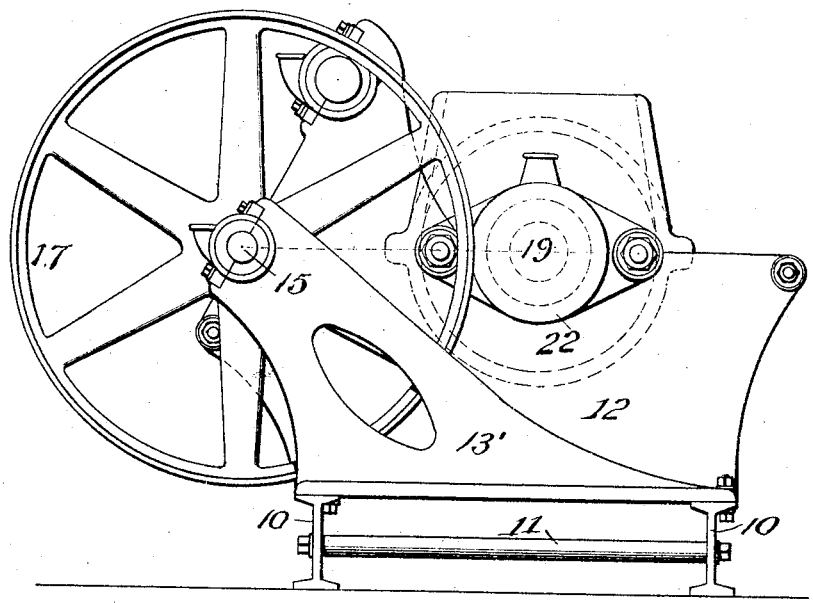
Figure 4:
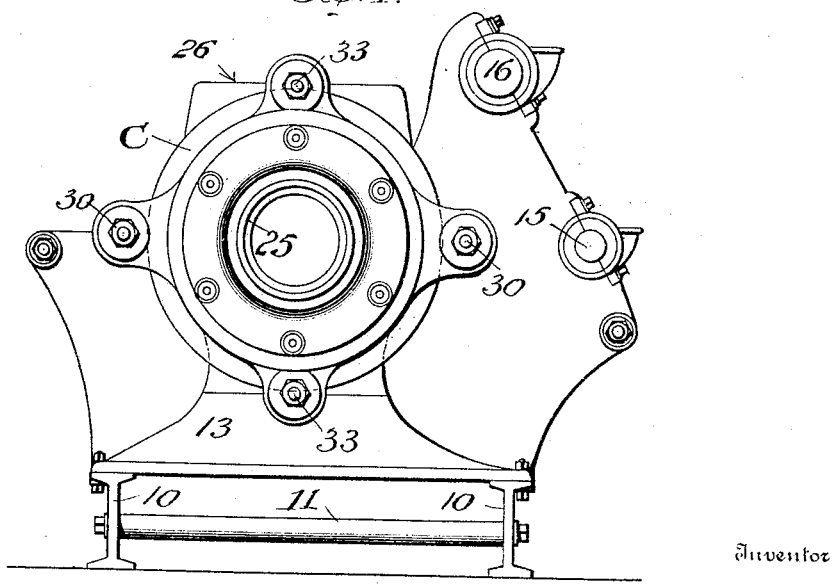

In the accompanying drawings, forming part of this specification, and in which similar reference characters indicate like parts throughout the several views, Figure 1 is a side elevation of a hollow-block machine embodying my invention. Fig. 2 is a top plan view, partially in section, of Fig. 1. Fig. 3 is an elevation looking toward the rear end of the machine. Fig. 4 is an elevation looking toward the front end of the machine.

In carrying out my invention I employ a suitable base or foundation, which is herein shown as consisting of appropriate longitudinal I-beam sills or skids 10, united by transverse rods or bolts 11 to form a rigid support. To the base thus formed I bolt or otherwise secure the frame 12 and the end standards 13 13', the former of which supports the front end of the clay-tempering cylinder, while the other supports the main driving-shaft, said standard 13' and the main frame being provided with appropriate journal-boxes 14, in which are mounted the parallel longitudinal shafts 15 16, having the usual or any suitable train of gearing G, through which the power of a driving-pulley 17 on the shaft 15 is transmitted to a gear 18 on the auger or propeller-shaft 19.

The machine is provided with a cylinder 20, in which the clay is tempered by the action of suitable blades 21, each of which has a suitable hub or sleeve, whose bore may be hexagonal or of other form in cross-section to correspond to the cross-sectional shape of the shaft 19 which said sleeve fits to prevent rotation of the sleeve on the shaft. The shaft 19 is also shown as having a suitable thrust-bearing 22, which may be of any desired character, and on this shaft in advance of the foremost propeller-blade are the expressing-augers 23 24, whose function it is to work the clay forward and express it under the desired pressure through the forming-die 25 at the front end of the machine, to which augers or propellers the tempering-blades advance the clay in the manner well known in this art. The tempering-blades are incased in the cylinder 20, and the clay is introduced into this cylinder through a suitable hopper 26.

One of the essential features of the present invention resides in the construction of the clay-expressing cylinder C, which cylinder I form of two telescoping sections 27 28 and in which cylinder the expressing-augers 23 and 24 are appropriately incased. The member 27 of the clay-expressing cylinder is provided with a base-flange 29, by which it is bolted to a corresponding flange on the front end of the clay-tempering cylinder, said flange 29 being also formed with bosses which serve as guides for suitable screws 30, which lie horizontally on each side of the cylinders and extend forward and extend through bosses on a die-plate 31. These screws extend back and are fixed to the frame of the machine, and by means of turnbuckles 32 or equivalent means the screws may be lengthened or shortened to adjust the members of the clay-expressing cylinder one relative to the other for a purpose I will hereinafter describe. Also by passing the screws through the flange of the member 27 of the clay-expressing cylinder and also through the die-plate 31 and employing suitable lock-nuts, as shown, the forward member 28 of the clay-expressing cylinder is securely held and prevented from being forced out of the companion member 27. In connection with the screws 30 and for assisting the latter in their function of adjusting the forward member of the clay-expressing cylinder I employ other horizontal screws, 33, arranged at ninety degrees to the first-named screws.

Owing to the great variety of clays and the shapes and sizes of the dies, it is difficult to determine the distance the die should be placed from the auger in order to get the bar of clay to travel uniformly in cross-section and to prevent the clay in its plastic state from crowding or "swimming" back past the propellers or augers and into the clay-tempering cylinder, and it is often necessary in making hollow building material to place the face of the die other than at a right angle with the face of the expressing-auger in order to require the clay to travel in a straight line or to get the material to dry straight after the block is formed. In my machine I have accomplished these objects by making the expressing-augers 23 24 of different sizes and separating said augers by a suitable space which prevents the clay crowding back past the augers and into the tempering-cylinder. By forming the clay-expressing cylinder of telescoping sections and fixing the forming-die, through which the clay is finally expressed and by which the finished product is given its shape, to the movable member or section of the cylinder the die can be adjusted to or from the expressing-auger and which adjustment will depend upon the character of the clay being operated upon, whereby the clay is caused to flow through the die more uniformly in cross-section and which uniformity of flow results in overcoming the tendency of the clay to work backward and the correction of such defects as the "ruffling" of the corners and the cracking of the partitions and walls of hollow ware composed of terra-cotta. By adjusting one side or top or bottom of the die-plate closer to the propeller than the other side, and this may be done by the aforesaid screws 30 and the other or top and bottom screws, 33, (shown in Fig. 1,) I obtain a material that will dry straight and travel in a straight line out of the die that forms the ware. By this same arrangement I am also enabled to so adjust the die as to overcome the pulsation of the blades of the auger, which causes ripples or waves in the bar of clay as it travels through the forming-die.

The fixed section 28 of the clay-expressing cylinder is provided with a removable lining 34, and the inner surfaces of the said sections are fluted, as at 35, so as to hold the body of clay from rotary movement while the expressing-augers are performing their work.

The operation of the machine is well known in the art and requires no elaborate description. The clay is fed into the clay-cylinder, where it is caught by the blades and stirred and tempered and finally forced forward to the augers, which latter then take the clay and express it through the space in the forming-die, said die being removably bolted in place and being given such desired design and configuration as the finished product is to have.

Having thus described my invention, what I claim as new, and desire to secure by Letters Patent, is—

1. In a machine of the character described the combination of a tempering-cylinder, tempering-blades operable therein, a shaft to which the blades are fixed, a clay-expressing cylinder composed of two telescopic sections axially in line with the tempering-cylinder, two expressing-augers of variable diameters both fixed to said shaft, one of said augers being located within each of said sections, a forming-die carried by the outermost of the sections, and means for adjusting the movable section with its forming-die relative to the said expressing-augers.

2. In a machine of the character described, the combination of a cylinder comprising a fixed section and an alined section movable longitudinally relative thereto said sections of substantially uniform diameter throughout and one having a greater diameter than the other, a forming-die carried by said movable section, and independent clay-expressing augers toward and from which said die is adjustable by means of said movable section of the cylinder, one of said augers being located in each of the sections and the augers being of variable diameters.

3. In a machine of the character described, the combination of clay-tempering blades and independent and alined clay-expressing augers, of a cylinder composed of alined sections each inclosing one of said augers said cylinders having different diameters and one of said augers being of greater diameter than the other, a forming-die carried by the movable section of the cylinder, and longitudinally-extending screw-rods whereby the die is adjustable toward and from the expressing-auger.

4. In a machine of the character described, the combination with a clay-tempering cylinder and tempering-blades rotatable therein, of a clay-expressing cylinder in line with the first-named cylinder and composed of a section fixedly secured to the clay-tempering cylinder and a section standing longitudinally in line with the other section and telescopically fitting within the fixed section, a forming-die carried by the movable section of said cylinder, and clay-expressing augers of unequal diameters one located in each of said sections and toward and from which augers said die is adjustable.

5. In a machine of the character described, the combination with a main supporting-frame, a clay-tempering cylinder, and tempering devices operating therein, of two rotary expressing-augers of variable diameters to which the clay is advanced, a sectional cylinder inclosing the augers and composed of telescopic sections one of which is movable longitudinally relative to said augers, a forming-die carried by the movable section of said cylinder, and means including horizontal screws arranged equidistant around the cylinder, two of said screws extending from the movable to the fixed section and the remaining screws extending from the movable section past the fixed section and clay-tempering cylinder to the main supporting-frame, for adjusting the movable section, and nuts for securing the section after adjustment.

In testimony whereof I have hereunto set my hand in presence of two subscribing witnesses.

WILLIAM R. CUNNINGHAM.

Witnesses:
J. S. DE LASHMUTT,
E. N. McCREARY.